(12) United States Patent
Elimelech et al.

(10) Patent No.: US 11,155,004 B2
(45) Date of Patent: Oct. 26, 2021

(54) INKJET PRINTING OF THREE-DIMENSIONAL CERAMIC PATTERN

(71) Applicant: NANO DIMENSIONS TECHNOLOGIES LTD., Nes Ziona (IL)

(72) Inventors: Hila Elimelech, Beer Tuvia (IL); Lior Yedidya, Jerusalem (IL)

(73) Assignee: Nano-Dimension Technologies, Nes Ziona (IL)

( * ) Notice: Subject to any disclaimer, the term of this patent is extended or adjusted under 35 U.S.C. 154(b) by 0 days.

(21) Appl. No.: 16/981,670

(22) PCT Filed: Mar. 18, 2019

(86) PCT No.: PCT/US2019/022763
§ 371 (c)(1),
(2) Date: Sep. 16, 2020

(87) PCT Pub. No.: WO2019/178599
PCT Pub. Date: Sep. 19, 2019

(65) Prior Publication Data
US 2021/0046670 A1   Feb. 18, 2021

Related U.S. Application Data (60) Provisional application No. 62/644,037, filed on Mar. 16, 2018.

(51) Int. Cl.
*B28B 1/00* (2006.01)
*B29C 64/112* (2017.01)
*B29C 64/393* (2017.01)
*B33Y 10/00* (2015.01)
*B33Y 70/00* (2020.01)

(52) U.S. Cl.
CPC ............ *B28B 1/001* (2013.01); *B29C 64/112* (2017.08); *B29C 64/393* (2017.08); *B33Y 10/00* (2014.12); *B33Y 70/00* (2014.12)

(58) Field of Classification Search
CPC ..... B28B 1/001; B29C 64/112; B29C 64/393; B33Y 70/00; B33Y 10/00
See application file for complete search history.

(56) References Cited

U.S. PATENT DOCUMENTS

| | | | |
|---|---|---|---|
| 2002/0154202 A1* | 10/2002 | Yamamoto | B41J 15/005 347/104 |
| 2005/0087903 A1 | 4/2005 | Farr et al. | |
| 2005/0089636 A1 | 4/2005 | Oriakhi et al. | |

(Continued)

FOREIGN PATENT DOCUMENTS

WO   2017131709 A1   8/2017

*Primary Examiner* — Nahida Sultana
(74) *Attorney, Agent, or Firm* — Guy Levi; The IP Law Firm of Guy Levi, LLC (57) ABSTRACT

The disclosure relates to systems, methods and compositions for inkjet printing of ceramic dielectric portions. Specifically, the disclosure relates to systems, methods and compositions for the inkjet printing of three dimensional patterns formed from pre-ceramic polymer derived interpenetrated networks that are comprised of at least two phases, or bi-continuous phases, one formed by free radical polymerization and the other by sol-gel polymerization.

18 Claims, 2 Drawing Sheets

(56) References Cited

U.S. PATENT DOCUMENTS

| | | |
|---|---|---|
| 2016/0214272 A1 | 7/2016 | Findley |
| 2017/0043535 A1 | 2/2017 | Ng et al. |
| 2018/0178447 A1* | 6/2018 | Abbott, Jr. ............. B33Y 10/00 |
| 2019/0061237 A1* | 2/2019 | Kimblad ................... B22F 7/06 |
| 2020/0047252 A1* | 2/2020 | Kritchman ............ B29C 64/209 |

* cited by examiner

FIG. 3

INKJET PRINTING OF THREE-DIMENSIONAL CERAMIC PATTERN

CROSS REFERENCE TO RELATED APPLICATIONS

This patent application is a U.S. National Phase filing of commonly owned PCT Application No. PCT/US19/22763, filed Mar. 18, 2019, claiming priority from U.S. Provisional Patent Application No. 62/644,037, filed Mar. 16, 2018, both which are incorporated herein by reference in their entirety.

BACKGROUND

The disclosure is directed to systems, methods and compositions for inkjet printing of ceramic and/or preceramic materials. Specifically, the disclosure is directed to systems methods and compositions for the inkjet printing of three-dimensional (3D) ceramic patterns formed from pre-ceramic precursors and/or polymer networks.

The aerospace industry exhibits recent increase in demand for flexibility in the design and fabrication of ceramic materials), as well as various components (e.g., multilayer ceramic capacitors, inductors, piezoelectric elements, thermistors, and the like). The increase in demand can be attributed, at least in part, to the requirement for complex geometries, as well as tolerance in extreme environments.

Traditional manufacturing methods cannot support such complex geometries of ceramic materials. Another main issue is the ability to fabricate composite materials that are combination of various materials in one object. Finally, traditional manufacturing methods has the disadvantage of relatively low resolution of fine details, which may be needed in these complex geometries.

Industrial ceramic 3D printing is mainly based on using ceramic particles. For example, by the DLP technique or SLA techniques, inks composed of ceramic particles dispersed in photopolymerizable monomers can be printed. However, these techniques do not enable rapid polymerization in thin layers, nor the necessary resolution.

The present disclosure is directed toward overcoming one or more of the above-identified shortcomings.

SUMMARY

Disclosed, in various embodiments, are systems, methods and compositions for the direct inkjet printing of three-dimensional (3D) ceramic patterns formed from pre-ceramic polymer-interpenetrated networks (PON), which are comprised of at least two phases or bi-continuous phases, one based on acrylate monomers and polymerizes by free radical polymerization and the other is based on pre-ceramic molecule, namely, consisting of silicon and oxygen atoms.

In an embodiment provided herein is a method for forming a three dimensional (3D) ceramic pattern using inkjet printer comprising: providing an ink jet printing system comprising: a print head having: at least one aperture, a pre-ceramic ink reservoir, and a pre-ceramic ink pump configured to supply a pre-ceramic ink composition through the aperture wherein, the pre-ceramic ink comprises a composition configured to form an interpenetrated polymer derived ceramic network PDCN a conveyor, operably coupled to the print head configured to convey a substrate to the print head; and a computer aided manufacturing ("CAM") module, comprising: a processor; a non-volatile memory; and a set of executable instructions stored on the non-volatile memory, which, when executed cause the processor to: receive a 3D visualization file representing the three dimensional pattern; generate a file that represents at least one, substantially 2D layer for printing the three dimensional pre-ceramic pattern; receive a selection of parameters related to the three dimensional pattern; and alter the file represents at least one, substantially 2D layer based on at least one of the selection of parameters, wherein the CAM module is configured to control the print head; providing the pre-ceramic inkjet ink composition; using the CAM module, obtaining a generated file representing a first, substantially 2D layer of the three dimensional pre-ceramic pattern for printing, the 2D layer comprising a pattern representative of the pre-ceramic inkjet ink; using the print head, forming the pattern corresponding to the pre-ceramic representation in the first, substantially 2D layer of the three dimensional pre-ceramic pattern for printing; curing the pattern corresponding to the pre-ceramic representation in the 2D layer of the three dimensional pre-ceramic pattern; simultaneously, before or after the step of curing, optionally pyrolyzing the pattern corresponding to the ceramic representation in the 2D layer of the three dimensional ceramic pattern thereby forming the interpenetrated ceramic polymer network; and removing the substrate, thereby fabricating a first three dimensional ceramic pattern layer.

In another embodiment, the ceramic ink comprises ceramic constituents configured to polymerize by sol-gel polymerization, and acrylate and/or methacrylate and/or vinyl constituents configured to polymerize by free radical polymerization.

In an embodiment, the ceramic ink can be a dispersion an emulsion, a gel, a suspension or a combination thereof.

In yet another embodiment, provided herein is a system for printing 3D ceramic pattern, the system comprising a print head having: at least one aperture, a ceramic ink reservoir, and a ceramic ink pump configured to supply a ceramic ink composition through the aperture wherein, the ceramic ink comprises a composition configured to form a pre-ceramic polymer interpenetrated networks (PCIN), wherein the PCIN is comprised of separate phases and/or bi-continuous phases; a conveyor, operably coupled to the print head configured to convey a substrate to the print head; and a computer aided manufacturing ("CAM") module, comprising: a processor; a non-volatile memory; and a set of executable instructions stored on the non-volatile memory, which, when executed cause the processor to: receive a 3D visualization file representing the three dimensional pattern; generate a file that represents at least one, substantially 2D layer for printing the three dimensional pattern; receive a selection of parameters related to the three dimensional pattern; and alter the file represents at least one, substantially 2D layer based on at least one of the selection of parameters, wherein the CAM module is configured to control the print head.

In an embodiment, provided herein is a processor-readable media having thereon a set of executable instructions which, when executed are configured to cause a processor to: receive a 3D visualization file representing the three dimensional ceramic pattern; generate a file that represents at least one, substantially 2D layer for printing the three dimensional ceramic pattern; receive a selection of parameters related to the three dimensional ceramic pattern; alter the file represents at least one, substantially 2D layer based on at least one of the selection of parameters; and control a print head to print the at least one, substantially 2D layer.

These and other features of the systems, methods and compositions for inkjet printing of pre-ceramic polymers, will become apparent from the following detailed description when read in conjunction with the figures and examples, which are exemplary, not limiting.

BRIEF DESCRIPTION OF THE FIGURES

For a better understanding of the inkjet PCINs, their fabrication methods and compositions, with regard to the embodiments thereof, reference is made to the accompanying examples and figures, in which.

illustrated on the bottom graphic; and

DETAILED DESCRIPTION

Provided herein are embodiments of for the inkjet printing of three dimensional ceramic patterns formed from pre-ceramic polymer interpenetrated networks PCIN) that are comprised of at least two phases, or bi-continuous phases, one formed by free radical polymerization and the other contains pre-ceramic structure which can also be polymerized by sol-gel polymerization.

Additionally, provided herein are stable ceramic inkjet ink compositions, which can yield, through an ink-jet printing, a pre-ceramic polymer, as well as the methods of printing multi-layers of the pre-ceramic polymer, to obtain various objects, and also achieving thermal stability, abrasion resistance and impact resistance that is superior to currently available dielectric materials.

The ceramic ink compositions provided herein can comprise organically modified, silicate-based ceramic (OR-MODS) co-monomers, which can have a ceramic constituent, configured to polymerize via sol-gel mechanism, conjugated to vinyl/acrylate/methacrylate constituents configured to polymerize via free radical polymerization and form a bi-continuous phase of PCIN.

Accordingly and in an embodiment, provided herein is a method for forming a three dimensional (3D) ceramic pattern using inkjet printer comprising: providing an ink jet printing system comprising: a print head having: at least one aperture, a ceramic ink reservoir, and a ceramic ink pump configured to supply a ceramic ink composition through the aperture wherein, the ceramic ink comprises a composition configured to form an interpenetrated pre-ceramic polymer network (PCIN); a conveyor, operably coupled to the print head configured to convey a substrate to the print head; and a computer aided manufacturing ("CAM") module, comprising: a processor; a non-volatile memory; and a set of executable instructions stored on the non-volatile memory, which, when executed cause the processor to: receive a 3D visualization file representing the three dimensional ceramic pattern; generate a file that represents at least one, substantially 2D layer for printing the three dimensional ceramic pattern; receive a selection of parameters related to the three dimensional ceramic pattern; and alter the file represents at least one, substantially 2D layer based on at least one of the selection of parameters, wherein the CAM module is configured to control the print head; providing the ceramic inkjet ink composition; using the CAM module, obtaining a generated file representing a first, substantially 2D layer of the three dimensional ceramic pattern for printing, the 2D layer comprising a pattern representative of the ceramic inkjet ink; using the print head, forming the pattern corresponding to the ceramic representation in the first, substantially 2D layer of the three dimensional ceramic pattern for printing; curing the pattern corresponding to the ceramic representation in the 2D layer of the three dimensional ceramic pattern; simultaneously, before or after the step of curing, optionally pyrolyzing the pattern corresponding to the ceramic representation in the 2D layer of the three dimensional ceramic pattern thereby forming the interpenetrated ceramic polymer network; and removing the substrate, thereby fabricating a first three dimensional ceramic pattern layer. In another embodiment, the method further comprises using the CAM module, obtaining a generated file representing a subsequent, substantially 2D layer of the 3D ceramic pattern for printing; and repeating the steps for forming a subsequent three-dimensional ceramic pattern layer.

The term "pre-ceramic polymer interpenetrated networks (PCIN)" refers to interpenetrating networks of ceramic or pre-ceramic constituents, infiltrated by, or conjugated to polymer networks of organic, thermoset polymers. In addition, the term "bi-continuous" is intended to be a reference to a morphology having two continuous interwoven interfaces. Thus, in the context of the disclosure the "bi-continuous phase of PCIN" denotes two continuous interwoven phases made up from the acrylate monomers, polymerizes by free radical polymerization and the other is based on pre-ceramic molecule, namely, consisting of silicon and oxygen atoms.

As indicated, the ceramic ink compositions provided herein, which are used in the methods implemented by the systems disclosed, can comprise ceramic constituents configured to polymerize through sol-gel polymerization, and vinyl/acrylate/methacrylate constituents configured to polymerize through free radical polymerization.

Generally, sol-gel polymerization, as used herein, refers to the process whereby the ceramic constituents comprising the ceramic ink, when printed under the proper conditions of temperature and concentration (configured to be above the three dimensional (3D) bond percolation threshold at about 23%, creating a de-facto phase transition), would undergo hydrolosis and condensation to form a sol (colloidal) dispersion which later aggregate and/or condensate to a three dimensional network thus forming a gel of the aggregates within the continuous liquid phase of the ceramic ink, comprising the organic constituents. As indicated, sol-gel reactions can promote the growth of colloidal particles' aggregates (sol) and their eventual network formation (gel) through the hydrolysis and condensation reactions of inorganic alkoxide monomers and/or oligomers. The precursors for synthesizing these colloids consist of a silica element surrounded by various reactive ligands. In other words, the ceramic constituents form a separate phase and/or bi-continuous phase than the organic acrylate/vinyl constituents. Upon injection, with some physico-chemical changes following deposition of the droplet on the substrate (e.g., rapid heating, some moisture evaporation), the ceramic constituents will undergo rapid condensation reaction, and form the sol-gel derived ceramic network portion of the PCIN. In an embodiment the sol-gel derived ceramic network portion comprises covalent linkages between sol-gel derived ceramic and the free radical derived vinyl/acrylate network portion of the PCIN. Further, the sol-gel derived ceramic and the free radical derived vinyl network portion of the PCIN, respectively, form interpenetrating networks within the composite region, or bi-continuous phases, or the sol-gel derived ceramic forms a continuous phase and the free radical derived vinyl portion forms a discontinuous (dispersed) phase within the 3D ceramic pattern. In an embodiment, the ceramic constituents form the sol-gel derived ceramic network, with between about 28% and 48% (w/w of printed and cured 3D ceramic pattern) of the final 3D ceramic pattern, while constituting between about 20% and about 80% w/w of the ceramic (liquid) ink composition (i.e., before printing)

Accordingly, the ceramic constituents configured to polymerize through sol-gel polymerization can be monomers, and/or oligomers of multi-functional silicates selected from the group comprising: tetraethyl orthosilicate, tetramethyl ortosilicate, tetraisopropyltitanate, trimethoxysilane (TMOS), triethoxysilane (TEOS), trimethyethoxysilane, phenyltriethoxysilane, phenylmethyldiethoxy silane, methyldiethoxysilane, vinylmethyldiethoxysilane, poly(dimethoxysilane), poly(diethoxysilane), Vinylmethoxysiloxan, poly(silazanes), as well as titanium isopropoxide, aluminum isopropoxide, zirconium propoxide, triethyl borate, trimethoxyboroxine diethoxysiloxane-ethyltitanate, titanium diisopropoxide bis(acetylacetonate), silanol poss, aluminium tri-sec-butoxide, triisobutylaluminium, aluminium acetylacetonate, 1,3,5,7,9-pentamethylcyclo pentasiloxane, poly(dibutyltitanate) oligomers of siloxane, and oligomers of Al—O—Al, oligomers of Ti—O—Ti, oligomers of Zn—O—Zn, or a composition comprising the foregoing, or in other embodiments an oxide network of silicon, aluminum, zirconium, titanium, tin, hafnium, tantalum, molybdenum, tungsten, rhenium, or iridium, or a mixture thereof.

Therefore, in an embodiment, the vinyl constituents configured to polymerize through free radical polymerization are monomers and/or oligomers selected from the group comprising a multi-functional acrylate, their carbonate copolymers, their urethane copolymers, or a composition of monomers and/or oligomers comprising the foregoing. Thus, the multifunctional acrylate is 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate or a multifunctiona acrylate composition comprising one or more of the foregoing.

Furthermore, the methods of forming the polymer-derived ceramic pattern described herein (formed after pyrolysis from the pre-ceramic inks provided), can further comprise a step of providing a peelable, or removable substrate, prior to the step of using the first print head, and/or the second print head. The optional peelable substrate can also be either rigid or flexible. The term "peelable" refers in an embodiment to materials that can be removably applied to and adhere to surfaces such as the surface created by the method, compositions and kits for forming printed 3D pre-ceramic pattern (or ceramic patterns following pyrolysis) described herein and can be subsequently removed from that surface by force. Peelable films according to the compositions and methods of this invention can be adhesively and removably applied to a chuck disposed on the printer's conveyor belt and, by virtue of being forcibly removed, expose a layer of the printed 3D (Pre-) ceramic pattern and the components described herein.

The removable substrate can also be a powder, for example, a ceramic powder, which can be applied to the chuck, compacted and later removed. The choice of substrate can depend, for example on the final printed 3D ceramic patterns use and structure. Furthermore, the removal of the substrate can take place at the end of the fabrication of the whole component, the fabrication of the first 2D layer, or at any stage in between.

EXAMPLE I

Figure 1:
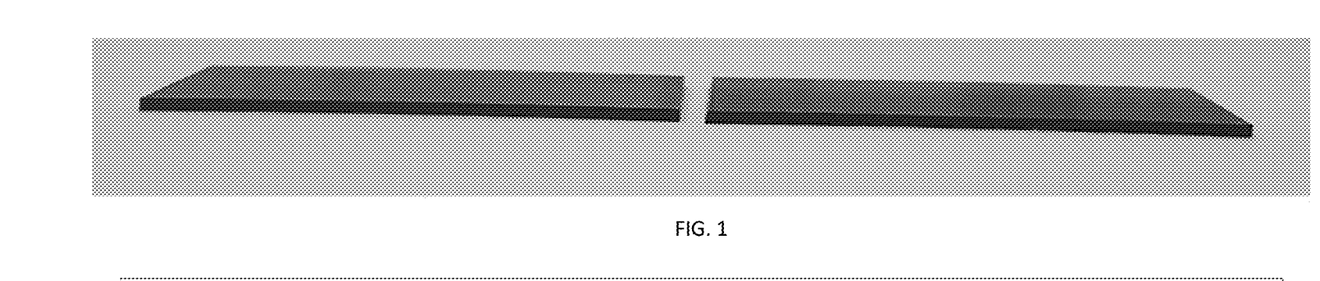
FIG. 1, shows a 3D pre-ceramic layer printed using the methods and compositions described herein.

A strip measuring Length 90.23 mm×Width 24.75 mm×2.19 mm was printed using the methods described herein (see e.g., FIG. 1).

Table 1 shows the ceramic ink characteristics obtained:

TABLE 1

| Ink Characteristics: | | |
|---|---|---|
| Parameter | Value | Units |
| Density (ρ) | 1.1 | g/ml |
| Surface Tension | 28 | Dynes/cm |
| Dynamic viscosity (η, 55° C.) | 13.8 | cP |
| Polymerization time | <1 | Sec |
| Ceramic constituents | 74 | % |

In order to fabricate the ceramic layer, it was necessary to narrow down on the proper conditions of the system and the ceramic ink composition that would enable proper printing. Using strobe station and an imaging module, conditions were determined to produce drop on demand conditions, in other words, droplets at the right place, amount and timing. The system parameters used are disclosed in Table 2.

TABLE 2

| Printing Conditions: | | |
|---|---|---|
| Parameter | Value | Units |
| Chuck Temp. | 100-150 | ° C. |
| Print head Temp. | 45-65 | ° C. |
| Print Head Voltage | 10-20 | V |
| Pulse | 2-10 | Msec |
| Piezo Frequency | 3-10 | kHz |

These conditions provided the proper apparent viscosity for the ink that would enable the rapid formation of the PCIN disclosed herein. The formulation used and the conditions described herein provided a highly smooth pre-ceramic layer, indicating high degree of PCIN polymerization.

Thermo-mechanical properties and dynamic mechanical analysis were measured using Dynamic Mechanical Analyzer (DMA) and Thermo-mechanical analyzer.

Storage modulus and tan-δ were measured by scanning the sample at 1 and 10 Hz. between 30° C. and 240° C.

Figure 2:
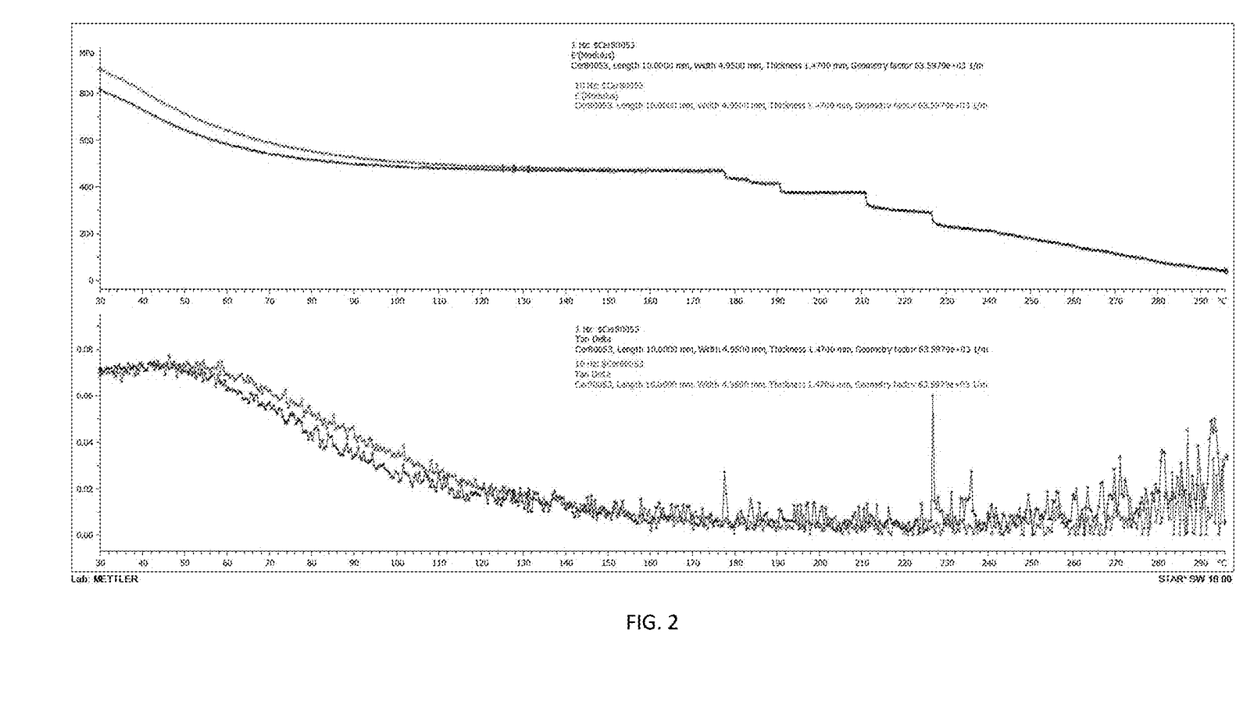
FIG. 2 illustrates the results of dynamic mechanical DMA analysis of the ceramic layer shown in FIG. 1, with the top graphic showing a frequency sweep as a function of temperature, showing changes in storage modulus (G') as a function of temperature, with the first derivative of the change $$\left(\frac{\partial G'}{\partial T} = \tan\delta\right)$$

Results are shown in FIG. 2, with the top graphic showing a frequency sweep as a function of temperature, showing changes in storage modulus (G') as a function of temperature, with the first derivative of the change $$\left(\frac{\partial G'}{\partial T} = \tan\delta\right)$$

illustrated on the bottom graphic. As illustrated the inflection point onset at around 46° C. (tan-d graphics) for the bottom line (1 Hz) and 58° C. for the top line (10 Hz), is indicative of the glass transition of the organic constituents of the PCIN, while the plateau representing the indifference to the changing conditions observed at around the 110-120° C., is indicative of ceramic materials.

Figure 3:
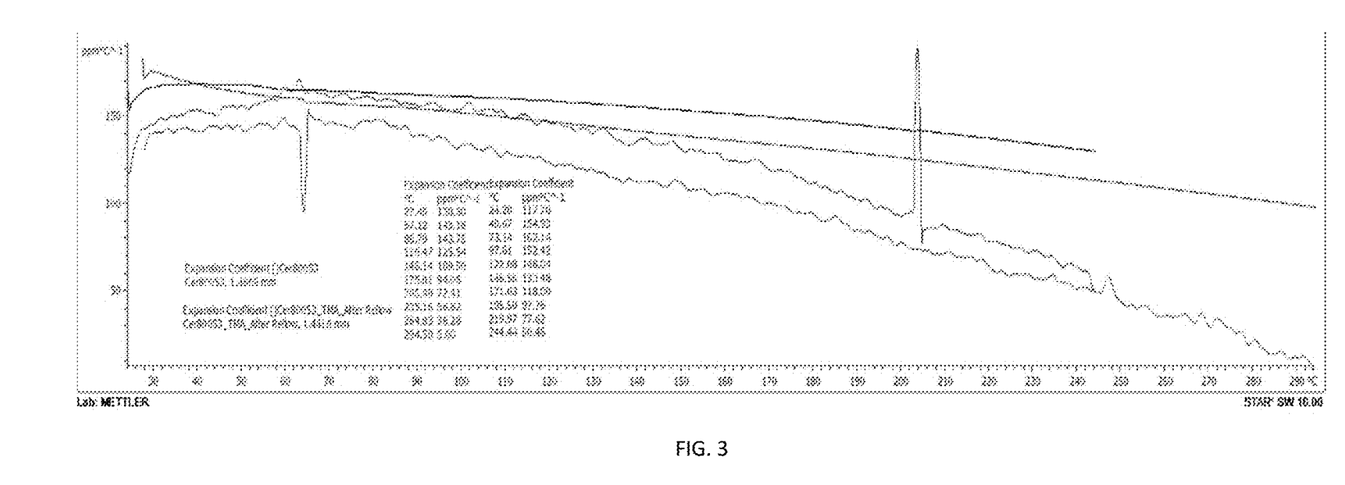
FIG. 3, is a graphic illustrating results of DMA analysis for a pre-ceramic layer printed via inkjet printing.

FIG. 3, illustrates the results of the TMA analysis, used to measure the thermal expansion coefficient of the sample. FIG. 3 is provided numerically in Table 3:

TABLE 3

| Thermal Expansion Coefficient CTE for pre-ceramic polymer | |
|---|---|
| ppm ° C.$^{-1}$ | C° |
| 130.3 | 27.45 |
| 143.2 | 57.12 |
| 143.8 | 86.79 |
| 125.5 | 116.47 |
| 109.5 | 146.14 |
| 94.1 | 175.81 |
| 72.4 | 205.48 |
| 56.8 | 235.16 |
| 36.3 | 264.83 |
| 5.0 | 294.5 |

The results of the thermal expansion coefficient, as a function of temperature $$\left(\frac{\partial^2 V}{\partial T}\right),$$

show that as temperature increase, the thermal expansion coefficient a, decreases, a behavior that is contrary to thermoset resins but is rather indicative of ceramic materials.

The ceramic ink composition provided comprises ceramic constituents with high reactivity e.g., Si—OR$_4$, co-suspended in vinyl constituents that provide the layer with stiffness, and can be configured to prevent the drastic densification (shrinkage) of the xerogel.

In an embodiment, the pre-ceramic pattern is pyrolyzed to form a 3D ceramic pattern. The term "pyrolysis" refers to thermal decomposition, or thermolysis, of organic material at elevated temperatures that may be either a complete or incomplete level of pyrolysis. In a specific embodiment, pyrolysis refers to thermolysis of a crosslinked polymer that accompanies generation of polymer derived nanocomposite or PDC material, such as at least one of silicon carbonitride, silicone oxycarbide, cristobalite, and tridymite. Alternatively or additionally, in circumstances with bi-phasic interpenetrating networks, whether continuous or not, pyrolysis refers to the thermolysis of the crosslinked organic portions of the interpenetrating networks.

Furthermore, the pyrolyzed 3D ceramic pattern(s) is (are) configured to exhibit density of between about 12 g/ml and about 22 g/ml, with thermal stability of no less than 1200° C. and shear strength of about 2 MPa in combination with compressive strength of 1.5 MPa. The pyrolysis can take place in an oven heated under inert condition using noble gasses, (e.g., Argon), and/or under ambient (i.e. oxygen-containing) atmosphere. Furthermore, pyrolysis temperature can be between about 700° C. and about 1500° C., while heating rate can vary depending on the desired density and strength (e.g., between 1° C./minute to 50° C./minute). It is understood that heating profile of the pre-ceramic pattern may be constant or variable and follow various stages of temperature changes (up or down) as well as pressure changes (up or down), each stage of pressure and temperature under inert atmosphere or under ambient atmosphere. All or some the foregoing factors that can be used in certain embodiment to obtain the physicochemical properties required from the final 3D ceramic pattern or components comprising the 3D ceramic pattern In an embodiment, pyrolysis is performed under conditions of time/temperature/pressure regimen configured to prevent crack formation and propagation caused by too rapid solvent removal. Fast solvent removal may cause uneven stresses through the pattern, which can lead to crack formation and propagation.

The term "forming" (and its variants "formed", etc.) refers in an embodiment to pumping, injecting, pouring, releasing, displacing, spotting, circulating, or otherwise placing a fluid or material (e.g., the pre-ceramic ink) in contact with another material (e.g., the substrate, or another layer) using any suitable manner known in the art.

Curing the pre-ceramic layer or pattern deposited by the appropriate print head as described herein, can be achieved by, for example, heating, photopolymerizing, drying, depositing plasma, annealing, facilitating redox reaction, irradiation by ultraviolet beam or a combination comprising one or more of the foregoing. Curing does not need to be carried out with a single process and can involve several processes either simultaneously or sequentially, (e.g., drying and heating and depositing crosslinking agent with an additional print head)

Furthermore, and in another embodiment, crosslinking refers to joining moieties together by covalent bonding using a cros slinking agent, i.e., forming a linking group, or by the radical polymerization of monomers such as, but not limited to methacrylates, methacrylamides, acrylates, or acrylamides. In some embodiment, the linking groups are grown to the end of the polymer arms. In preferred embodiments, siloxane-polymers conjugates have alkenyl groups and are crosslinked by radical polymerization the absence or presence of other molecules that contain alkenyl groups, such as, but not limited to, methacrylates, methacrylamides, acrylates, or acrylamides and crosslinkers and radical, anionic, cationic initiators.

In an embodiment, the term "copolymer" means a polymer derived from two or more monomers (including terpolymers, tetrapolymers, etc.), and the term "polymer" refers to any carbon-containing compound having repeat units from one or more different monomers.

Likewise, other functional heads may be located before, between or after the pre-ceramic ink print head. These may include a source of electromagnetic radiation configured to emit electromagnetic radiation at a predetermined wavelength (X), for example, between 190 nm and about 400 nm, e.g. 395 nm which in an embodiment, can be used to accelerate and/or modulate and/or facilitate a photopolymerizable constituent used in the pre-ceramic ink. Other functional heads can be heating elements, additional printing heads with various inks (e.g., support, label printing of various components for example capacitors, transistors and the like) and a combination of the foregoing.

Other similar functional steps (and therefore means for affecting these steps) may be taken before or after the pre-ceramic polymer ink print head (e.g., for initiating hydrolysis). These steps may include (but not limited to): a heating step (affected by a heating element, or hot air); photobleaching (of a photoresist mask support pattern), photocuring, or exposure to any other appropriate actinic radiation source (using e.g., a UV light source); drying (e.g., using vacuum region, or heating element); (reactive) plasma deposition (e.g., using pressurized plasma gun and a plasma beam controller); prior to coating; annealing, or facilitating redox reactions and their combination regardless of the order in which these processes are utilized. In certain embodiment, a laser (for example, pyrolysis by selective laser sintering/melting, direct laser sintering/melting of the pre-ceramic 3D patterns), or electron-beam melting can be used on the pre-ceramic 3D pattern.

Formulating the ceramic ink compositions provided herein, may take into account the requirements, if any, imposed by the deposition tool (e.g., in terms of viscosity and surface tension of the composition) and the deposition surface characteristics (e.g., hydrophilic or hydrophobic, and the interfacial energy of the peelable or removable substrate, or chuck), or the substrate layer on which consecutive layers are deposited. Using ink-jet printing with a piezo head, the viscosity of the pre-ceramic ink (measured at the printing temperature ° C.) can be, for example, not lower than about 5 cP, e.g., not lower than about 8 cP, or not lower than about 10 cP, and not higher than about 30 cP, e.g., not higher than about 20 cP, or not higher than about 15 cP. The ceramic ink, can each be configured (e.g., formulated) to have a dynamic surface tension (referring to a surface tension when an ink-jet ink droplet is formed at the printhead aperture) of between about 25 mN/m and about 35 mN/m, for example between about 29 mN/m and about 31 mN/m measured by maximum bubble pressure tensiometry at a surface age of 50 ms and at 25° C.

In an embodiment, the term "chuck" is intended to mean a mechanism for supporting, holding, or retaining a substrate or a workpiece. The chuck may include one or more pieces. In one embodiment, the chuck may include a combination of a stage and an insert, a platform, be jacketed or otherwise be configured for heating and/or cooling and have another similar component, or any combination thereof.

In an embodiment, the ink-jet ink compositions, systems and methods allowing for a direct, continuous or semi-continuous ink-jet printing of 3D ceramic pattern(s) can be patterned by expelling droplets of the liquid ink-jet ink provided herein from an orifice one-at-a-time, as the printhead (or the substrate) is maneuvered, for example in two (X-Y) (it should be understood that the print head can also move in the Z axis) dimensions at a predetermined distance above the removable substrate or any subsequent layer. The height of the print head can be changed with the number of layers, maintaining for example a fixed distance. Each droplet can be configured to take a predetermined trajectory to the substrate on command by, for example a pressure impulse, via a deformable piezo-crystal in an embodiment, from within a well operably coupled to the orifice. The printing of the first inkjet pre-ceramic ink can be additive and can accommodate a greater number of layers. The ink-jet print heads provided used in the methods described herein can provide a minimum layer film thickness equal to or less than about 0.3 µm-10,000 µm Similarly, the term "contacting" is used in an embodiment to refer to materials which may be blended, mixed, slurried, dissolved, reacted, treated, or otherwise contacted in some other manner. Therefore, the term "contacting" encompasses the "reacting" of two or more components, and it also encompasses the "mixing" or "blending" of two or more components that do not react with one another.

The conveyor maneuvering among the various print heads used in the methods described and implementable in the systems described can be configured to move at a velocity of between about 5 mm/sec and about 1000 mm/sec. The velocity of the e.g., chuck can depend, for example, on: the desired throughput, the number of print heads used in the process, the number and thickness of layers of the printed 3D (Pre-) ceramic pattern(s) described herein printed, the curing time of the ink, the evaporation rate of the ink solvents, the distance between the print head(s)

In an embodiment, the volume of each droplet of the pre-ceramic polymer ink, can range from 0.5 to 300 picoLiter (pL), for example 1-4 pL and depended on the strength of the driving pulse and the properties of the ink. The waveform to expel a single droplet can be a 10V to about 70 V pulse, or about 16V to about 20V, and can be expelled at frequencies between about 2 kHz and about 500 kHz.

The pre-ceramic inks can be configured to be stable within a print head reservoir. For example, the solid contents (i.e., suspended solids if colloidal suspension, or solute if a solution) can be between about 5 wt % and about 100 wt %. In certain embodiments, surfactants may not be necessary and the ink can be 100% active, by incorporating photoactive monomers/oligomers (the organic constituents) and their combination, in which no appreciable sedimentation takes place. Further, the ink viscosity can be adjusted to facilitate ejection of droplets. This can be done by controlling, for example, the print head's temperature, and/or the reservoir's temperature. Accordingly, in an embodiment, the surface energy ($\gamma$) together with dynamic viscosity ($\mu$) of the pre-ceramic ink solutions (or any other suspended system form) used in the methods of forming the printed 3D (Pre-) ceramic pattern(s) described herein can be in the range of between about 25 mN/m and about 35 mN/m and between about 8 mNs/m$^2$ (cP) and about 15 mNs/m$^2$ (cP), respectively. Pre-ceramic inks used in certain embodiments, which are comprised of suspended sub-micron particles (e.g., the ceramic constituents), for example in the printed 3D (Pre-) ceramic pattern(s), inks can be configured to facilitate optimal operation as determined by some thresholds (e.g., nozzle orifice and nozzle neck) inside micro liquid channels of the print head(s).

As described, the parameters used in the step of selection of parameters related to the inkjet printing of 3D ceramic pattern(s) performed by the CAM module used for the its fabrication, can be, for example at least one of: related to the three dimensional ceramic pattern are; the ceramic pattern in the layer, curing requirements for the organic constituents used, throughput requirement, substrate temperature, print head temperature, print head voltage, ink expelling velocity, and printing velocity, or a combination of parameters comprising one or more of the foregoing.

The use of the term "module" does not imply that the components or functionality described or claimed as part of the module are all configured in a (single) common package. Indeed, any or all of the various components of a module, whether control logic or other components, can be combined in a single package or separately maintained and can further be distributed in multiple groupings or packages or across multiple (remote) locations and devices.

The CAM module can comprise : a 2D file library storing the files converted from the 3D visualization files of the printed 3D (Pre-) ceramic pattern(s) components; a processor in communication with the library; a memory device storing a set of operational instructions for execution by the processor; a micromechanical inkjet print head or heads in communication with the processor and with the library; and a print head (or, heads') interface circuit in communication with the 2D file library, the memory and the micromechanical inkjet print head or heads, the 2D file library configured to provide printer operation parameters specific to a functional layer; pre-processing Computer-Aided Design/Computer-Aided Manufacturing (CAD/CAM) generated information associated with the 3D printed ceramic pattern(s) to be fabricated, thereby obtaining a plurality of 2D file; loading the plurality of 2D file(s) processed in the step of pre-processing from the printed 3D (Pre-) ceramic pattern(s) 3D visualization files onto the 2D file library; and using the 2D file library, instructing the processor to print the predetermined layer of the printed 3D (Pre-) ceramic pattern(s) in a predetermined order.

The 3D visualization file representing the printed 3D (Pre-) ceramic pattern(s) used for the fabrication of the printed 3D (Pre-) ceramic pattern(s) described herein, can be: an ODB, an ODB++, an.asm, an STL, an IGES, a STEP, a Catia, a SolidWorks, a Autocad, a ProE, a 3D Studio, a Gerber, a Rhino a Altium, an Orcad, an or a file comprising one or more of the foregoing; and wherein file that represents at least one, substantially 2D layer (and uploaded to the library) can be, for example at least one of a JPEG, a GIF, a TIFF, a BMP, a PDF file, or a combination comprising one or more of the foregoing.

In certain embodiments, the CAM module further comprises a computer program product for fabricating one or more composite objects comprising 3D ceramic pattern(s), for example, an electronic component, machine part, a connector and the like. The printed component/object(s) can comprise at least one of a discrete metallic (conductive) components, discrete resinous components and ceramic components that are each and being printed optionally simultaneously or sequentially and continuously. The term "continuous" and its variants are intended to mean printing in a substantially unbroken process. In another embodiment, continuous refers to a layer, member, or structure in which no significant breaks in the layer, member, or structure lie along its length.

The computer controlling the printing process described herein can comprise: a computer readable storage medium having computer readable program code embodied therewith, the computer readable program code when executed by a processor in a digital computing device causes a three-dimensional inkjet printing unit to perform the steps of: pre-processing Computer-Aided Design/Computer-Aided Manufacturing (CAD/CAM) generated information associated with the printed 3D (Pre-) ceramic pattern(s) described herein (in other words, the 3D visualization file representing the printed 3D (Pre-) ceramic pattern(s) components) to be fabricated, thereby obtaining a plurality of 2D files (in other words, the file that represents at least one, substantially 2D layer for printing composite components e.g., that does or does not including 3D ceramic pattern(s) as well as compartment designation for other components), each 2D file specific for a predetermined pre-ceramic pattern layer in a specific order; loading the plurality of 2D file s processed in the step of pre-processing onto a 2D file library; directing a stream of droplets of, for example, the pre-ceramic ink material from a first inkjet print head of the three-dimensional inkjet printing unit at a surface of a substrate (for example, a heated chuck); moving the inkjet heads relative to the substrate in an x-y plane of the substrate, wherein the step of moving the inkjet heads relative to the substrate in the x-y plane of the substrate, for each of a plurality of layers is performed in a layer-by-layer fabrication of the printed 3D (Pre-) ceramic pattern(s) described herein.

In addition, the computer program, can comprise program code means for carrying out the steps of the methods described herein, as well as a computer program product comprising program code means stored on a medium that can be read by a computer, such as a floppy disk, a hard disk, CD-ROM, DVD, USB memory stick, or a storage medium that can be accessed via a data network, such as the Internet or Intranet, when the computer program product is loaded in the main memory of a computer and is carried out by the computer.

Memory device(s) as used in the methods described herein can be any of various types of non-volatile memory devices or storage devices (in other words, memory devices that do not lose the information thereon in the absence of power). The term "memory device" is intended to encompass an installation medium, e.g., a CD-ROM, floppy disks, or tape device or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed (e.g., the 3D inkjet printer provided), and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network. Accordingly, for example, the bitmap library can reside on a memory device that is remote from the CAM module coupled to the 3D inkjet printer provided, and be accessible by the 3D inkjet printer provided (for example, by a wide area network).

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical structural (in other words, PCIN) layers.

Furthermore, as used herein, the term "2D file library" refers to a given set of files that together define a single printed 3D pre-ceramic pattern, or a plurality of 3D pre-ceramic patterns used for a given purpose. It is noted that the 2D file library is of the substantially 2D representation image of the 2D layer. The term "2D file library" can also be used to refer to a set of 2D files or any other raster graphic file format (the representation of images as a collection of pixels, generally in the form of a rectangular grid, e.g., BMP, PNG, TIFF, GIF), capable of being indexed, searched, and reassembled to provide the structural layers of a given component not including 3D ceramic pattern(s) whether the search is for the printed 3D (Pre-) ceramic pattern described herein, or a given specific layer without the ceramic pattern.

The Computer-Aided Design/Computer-Aided Manufacturing (CAD/CAM) generated information associated with the printed 3D (Pre-) ceramic pattern(s) described herein to be fabricated, which is used in the methods, programs and libraries can be based on converted CAD/CAM data packages can be, for example, IGES, DXF, DWG, DMIS, NC files, GERBER® files, EXCELLON®, STL, EPRT files, an ODB, an ODB++, an.asm, an STL, an IGES, a STEP, a Catia, a SolidWorks, a Autocad, a ProE, a 3D Studio, a Gerber, a Rhino a Altium, an Orcad, an Eagle file or a package comprising one or more of the foregoing. Additionally, attributes attached to the graphics objects transfer the meta-information needed for fabrication and can precisely define the printed 3D (Pre-) ceramic pattern(s) described herein, resulting in an efficient and effective transfer of fabrication data from design (3D visualization CAD e.g.,) to fabrication (CAM e.g.,). Accordingly and in an embodiment, using pre-processing algorithm, GERBER®, EXCELLON®, DWG, DXF, STL, EPRT ASM, and the like as described herein, are converted to 2D files.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the print head(s) includes one or more print head). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Furthermore, the terms "first," "second," and the like, herein do not denote any order, quantity, or importance, but rather are used to denote one element from another.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Accordingly and in an embodiment, provided herein is a method for forming a three-dimensional (3D) ceramic pattern using inkjet printer comprising: providing an ink jet printing system comprising: a print head having: at least one aperture, a pre-ceramic ink reservoir, and a pre-ceramic ink pump configured to supply a pre-ceramic ink composition through the aperture wherein, the pre-ceramic ink composition comprises a composition configured to form polymer-derived ceramic interpenetrated networks; a conveyor, operably coupled to the print head configured to convey a substrate to the print head; and a computer aided manufacturing ("CAM") module, comprising: a processor; a non-volatile memory storing thereon a set of executable instructions stored on the non-volatile memory, which, when executed, cause the processor to: receive a 3D visualization file representing the three dimensional ceramic pattern; generate a file that represents at least one, substantially 2D layer for printing the three dimensional ceramic pattern; receive a selection of parameters related to the three dimensional ceramic pattern; and alter the file represents at least one, substantially 2D layer based on at least one of the selection of parameters, wherein the CAM module is configured to control the print head; providing the pre-ceramic inkjet ink composition; using the CAM module, obtaining a generated file representing a first, substantially 2D layer of the three-dimensional ceramic pattern for printing, the 2D layer comprising a pattern representative of the pre-ceramic pattern; using the print head, forming the pattern corresponding to the ceramic representation in the first, substantially 2D layer of the three-dimensional pre-ceramic pattern for printing; curing the pre-ceramic pattern corresponding to the representation in the 2D layer of the three-dimensional ceramic pattern; simultaneously, or after the step of curing, pyrolyzing the pattern corresponding to the ceramic representation in the 2D layer of the three-dimensional ceramic pattern thereby forming the interpenetrated ceramic polymer-derived network; removing the substrate, thereby fabricating a first three-dimensional ceramic pattern layer, wherein (i) the pre-ceramic ink comprises ceramic constituents configured to polymerize through sol-gel polymerization, and at least one of vinyl, methacrylate, and organic constituents configured to polymerize through free radical polymerization, further (ii) comprising using the CAM module, obtaining a generated file representing a subsequent, substantially 2D layer of the 3D ceramic pattern for printing; and repeating the steps for forming a subsequent three-dimensional ceramic pattern layer, (iii) the ceramic constituents configured to polymerize through sol-gel polymerization are monomers, and/or oligomers selected from the group comprising: tetraethyl orthosilicate, tetramethyl ortosilicate, tetraisopropyltitanate, trimethoxysilane (TMOS), triethoxysilane, trimethyethoxysilane, phenyltriethoxysilane, phenylmethyldiethoxy silane, methyldiethoxysilane, vinylmethyldiethoxysilane, polydimethoxysilane, polydiethoxysilane, Vinylmethoxysiloxan, polysilazanes, titanium isopropoxide, aluminum isopropoxide, zirconium propoxide, triethyl borate, trimethoxyboroxine diethoxysiloxane-ethyltitanate, titanium diisopropoxide bis(acetylacetonate), silanol poss, aluminium tri-sec-butoxide, triisobutylaluminium, aluminium acetylacetonate, 1,3,5,7,9-pentamethylcyclo pentasiloxane, poly(dibutyltitanate) oligomers of siloxane, and oligomers of Al—O—Al, oligomers of Ti—O—Ti, oligomers of Zn—O—Zn, or a composition comprising the foregoing, wherein (iv) the at least one of vinyl, acrylate, methacrylate and organic constituents configured to polymerize through free radical polymerization are at least one of monomers, and oligomers selected from the group comprising a multi-functional acrylate, their carbonate copolymers, their urethane copolymers, or a composition of monomers and/or oligomers comprising the foregoing, (v) the multi-functional acrylate is 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl)isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate or a multifunctiona acrylate composition comprising one or more of the foregoing, (vi) wherein the step of curing comprises heating, photopolymerizing, drying, depositing plasma, cross linking, annealing, facilitating redox reaction, or a combination comprising one or more of the foregoing, wherein (vii) the step of optionally pyrolyzing comprises locally heating the pattern at a temperature of between about 200° C. and about 1200° C., wherein (viii) the pre-ceramic ink composition is a suspension, an emulsion, a solution, or a composition comprising the foregoing, (ix) the pre-ceramic ink further comprising: a radical photoinitiator; and a cross-linking agent that is different than the multifunctional acrylate monomer, oligomer or polymer, wherein (x) the parameters used in the selection of parameters related to the three-dimensional ceramic pattern are at least one of; the ceramic pattern in the layer, curing requirements for the at least one of the vinyl, acrylate, and organic constituents used, throughput requirement, optional substrate temperature, print head temperature, print head voltage, ink expelling velocity, and printing velocity, or a combination of parameters comprising one or more of the foregoing, wherein (xi) the 3D visualization file representing the three dimensional ceramic pattern is an .asm, an STL, a DFX file, a CN file, an IGES, a STEP, a Catia, a SolidWorks, a ProE, a 3D Studio, a Gerber, an Excellon file, a Rhino file or a file comprising one or more of the foregoing; and wherein file that represents at least one, substantially 2D layer is a JPEG, a GIF, a TIFF, a BMP, a PDF file, or a combination comprising one or more of the foregoing, wherein (xii) the ceramic constituents weight concentration (w/we) is between about 20% and about 48% (w/w) of the final 3D ceramic pattern, wherein (xiii) the radical photoinitiator is ethyl(2,4,6, trimethyl benzoil) phenyl phosphinate), benzophenone and acetophenone compounds, mixed triarylsulfonium hexafluoroantimonate salts, 2-ispropylthioxanthone or a radical photinitiator composition comprising one or more of the foregoing, wherein (xiv) the ceramic constituents comprise between about 20% and about 80% (w/w) of the pre-ceramic ink composition, (xv) the ceramic constituents are adapted to form a xerogel upon printing, wherein (xvi) the polymer derived ceramic interpenetrated network is comprised of separate phases and/or bi-continuous phases, and wherein (xvii) the sol-gel polymerized constituents comprises an oxide network of silicon, aluminum, zirconium, titanium, tin, hafnium, tantalum, molybdenum, tungsten, rhenium, or iridium, or a mixture thereof.

Although the foregoing disclosure for 3D printing of ceramic pattern(s) (i.e., post pyrolysis) using inkjet printing based on converted 3D visualization CAD/CAM data packages has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods, programs, libraries and systems described herein may be embodied in a variety of other forms without departing from the spirit thereof. Accordingly, other combinations, omissions, substitutions and modifications will be apparent to the skilled artisan in view of the disclosure herein.

What is claimed:

1. A method for forming a three-dimensional (3D) ceramic pattern using inkjet printer comprising:
   a. providing an ink jet printing system comprising:
      i. a print head having: at least one aperture, a pre-ceramic ink reservoir, and a pre ceramic ink pump configured to supply a pre-ceramic ink composition through the aperture wherein, the pre-ceramic ink comprises a composition configured to form polymer-derived ceramic interpenetrated networks;
      ii. a conveyor, operably coupled to the print head configured to convey a substrate to the print head; and
      iii. a computer aided manufacturing ("CAM") module, comprising: a processor; a non-volatile memory storing thereon a set of executable instructions stored on the non-volatile memory, which, when executed, cause the processor to: receive a 3D visualization file representing the three dimensional ceramic pattern; generate a file that represents at least one, substantially 2D layer for printing the three dimensional ceramic pattern; receive a selection of parameters related to the three dimensional ceramic pattern; and alter the file represents at least one, substantially 2D layer based on at least one of the selection of parameters, wherein the CAM module is configured to control the print head;
   b. providing the pre-ceramic inkjet ink composition;
   c. using the CAM module, obtaining a generated file representing a first, substantially 2D layer of the three-dimensional ceramic pattern for printing, the 2D layer comprising a pattern representative of the pre-ceramic pattern;
   d. using the print head, forming the pattern corresponding to the ceramic representation in the first, substantially 2D layer of the three-dimensional pre-ceramic pattern for printing;
   e. curing the pre-ceramic pattern corresponding to the representation in the 2D layer of the three-dimensional ceramic pattern;
   f. simultaneously, or after the step of curing, pyrolyzing the pattern corresponding to the ceramic representation in the 2D layer of the three-dimensional ceramic pattern thereby forming the interpenetrated ceramic polymer-derived network;
   g. removing the substrate, thereby fabricating a first three-dimensional ceramic pattern layer.

2. The method of claim 1, wherein the pre-ceramic ink comprises ceramic constituents configured to polymerize through sol-gel polymerization, and at least one of vinyl, methacrylate, and organic constituents configured to polymerize through free radical polymerization.

3. The method of claim 1, further comprising using the CAM module, obtaining a generated file representing a subsequent, substantially 2D layer of the 3D ceramic pattern for printing; and repeating the steps for forming a subsequent three-dimensional ceramic pattern layer.

4. The method of claims 2 wherein the ceramic constituents configured to polymerize through sol-gel polymerization are monomers, and/or oligomers selected from the group comprising: tetraethyl orthosilicate, tetramethyl ortosilicate, tetraisopropyltitanate, trimethoxysilane (TMOS), triethoxysilane, trimethyethoxysilane, phenyltriethoxysilane, phenylmethyldiethoxy silane, methyldiethoxysilane, vinylmethyldiethoxysilane, polydimethoxysilane, polydiethoxysilane, Vinylmethoxysiloxan, polysilazanes, titanium isopropoxide, aluminum isopropoxide, zirconium propoxide, triethyl borate, trimethoxyboroxine diethoxysiloxaneethyltitanate, titanium diisopropoxide bis(acetylacetonate), silanol poss, aluminium tri-sec -butoxide, triisobutylaluminium, aluminium acetylacetonate, 1,3,5,7,9-pentamethylcyclo pentasiloxane, poly(dibutyltitanate) oligomers of siloxane, and oligomers of Al—O—Al, oligomers of Ti—O—Ti, oligomers of Zn—O—Zn, or a composition comprising the foregoing.

5. The method of claim 2, wherein the at least one of vinyl, acrylate, methacrylate and organic constituents configured to polymerize through free radical polymerization are at least one of monomers, and oligomers selected from the group comprising a multi-functional acrylate, their carbonate copolymers, their urethane copolymers, or a composition of monomers and/or oligomers comprising the foregoing.

6. The method of claim 5, wherein the multifunctional acrylate is 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl) isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate or a multifunctiona acrylate composition comprising one or more of the foregoing.

7. The method of claim 3, wherein the step of curing comprises heating, photopolymerizing, drying, depositing plasma, cross linking, annealing, facilitating redox reaction, or a combination comprising one or more of the foregoing.

8. The method of claim 7, wherein the step of optionally pyrolyzing comprises locally heating the pattern at a temperature of between about 200° C. and about 1200° C.

9. The method of claim 8, wherein the pre-ceramic ink composition is a suspension, an emulsion, a solution, or a composition comprising the foregoing.

10. The method of claim 5, wherein the pre-ceramic ink further comprising: a radical photoinitiator; and a crosslinking agent that is different than the multifunctional acrylate monomer, oligomer or polymer.

11. The method of claim 10, wherein the parameters used in the selection of parameters related to the three-dimensional ceramic pattern received by the processor, are at least one of: the ceramic pattern in the layer, curing requirements for the at least one of the vinyl, acrylate, and organic constituents used, throughput requirement, optional substrate temperature, print head temperature, print head voltage, ink expelling velocity, and printing velocity.

12. The method of claim 11, wherein the 3D visualization file representing the three dimensional ceramic pattern is an .asm, an STL, a DFX file, a CN file, an IGES, a STEP, a Catia, a SolidWorks, a ProE, a 3D Studio, a Gerber, an Excellon file, a Rhino file or a file comprising one or more of the foregoing; and wherein file that represents at least one, substantially 2D layer is a JPEG, a GIF, a TIFF, a BMP, a PDF file, or a combination comprising one or more of the foregoing.

13. The method of claim 4, wherein the ceramic constituents weight concentration (w/we) is between about 20% and about 48% (w/w) of the final 3D ceramic pattern.

14. The method of claim 10, wherein the radical photoinitiator is ethyl(2,4,6, trimethyl benzoil) phenyl phosphinate), benzophenone and acetophenone compounds, mixed triarylsulfonium hexafluoroantimonate salts, 2-ispropylthioxanthone or a radical photinitiator composition comprising one or more of the foregoing.

15. The method of claim 4, wherein the ceramic constituents comprise between about 20% and about 80% (w/w) of the pre-ceramic ink composition.

16. The method of claim 1, wherein the ceramic constituents are adapted to form a xerogel upon printing.

17. The method of claim 1, wherein the polymer derived ceramic interpenetrated network is comprised of separate phases and/or bi-continuous phases.

18. The method of claim 2, wherein the sol-gel polymerized constituents comprises an oxide network of silicon, aluminum, zirconium, titanium, tin, hafnium, tantalum, molybdenum, tungsten, rhenium, or iridium, or a mixture thereof.

* * * * *